United States Patent [19]
Nakajima et al.

[11] Patent Number: 5,737,647
[45] Date of Patent: Apr. 7, 1998

[54] CAMERA

[75] Inventors: Hidekazu Nakajima, Higashiosaka; Hiroyuki Okada, Izumi, both of Japan

[73] Assignee: Minolta Co., Ltd., Japan

[21] Appl. No.: 790,596

[22] Filed: Jan. 29, 1997

[30] Foreign Application Priority Data

Jan. 29, 1996 [JP] Japan .................................. 8-013065

[51] Int. Cl.[6] .............................. G03B 13/36; G03B 15/03
[52] U.S. Cl. .................................. 396/106; 396/158
[58] Field of Search .................................. 396/106, 108, 396/157, 158

[56] References Cited

U.S. PATENT DOCUMENTS

| 5,289,219 | 2/1994 | Masuda et al. | 396/158 |
| 5,317,361 | 5/1994 | Fukuhara et al. | 396/158 |
| 5,317,362 | 5/1994 | Takahashi | 396/158 |

*Primary Examiner*—W. B. Perkey
*Attorney, Agent, or Firm*—Burns, Doane, Swecker & Mathis, L.L.P.

[57] ABSTRACT

A camera that emits auxiliary light for the reduction of the red-eye phenomenon and auxiliary light for distance measurement when the photo object brightness is low using a single light source, wherein when auxiliary light is emitted for distance measurement immediately before a photo is taken, the emission of auxiliary light for the reduction of the red-eye phenomenon is omitted.

19 Claims, 4 Drawing Sheets

CAMERA

BACKGROUND OF THE INVENTION

1. Field of the Invention

The present invention pertains to a camera, particularly to a camera equipped with light source used for photography using a flash (hereinafter 'flash photography'), and more particularly, to a camera equipped with a light source that performs preliminary light emission to reduce the red-eye phenomenon that occurs during flash photography as well as auxiliary light emission for distance measurement when the brightness of the photo object is low.

2. Description of the Related Art

Cameras have been conventionally proposed that reduce the diameter of the pupils of a person, the photo object, by means of emitting flash light prior to photo-taking in order to reduce the red-eye phenomenon during flash photography (see Japanese Laid-Open Patent Hei 2-204732). Cameras equipped with a distance measurement device employing the passive method have also been proposed, that perform distance measurement by illuminating the photo object via the projection of a flash light onto the photo object when the brightness of the photo object is so low that distance measurement is not possible.

FIG. 6 shows changes over time in the pupil when a human eye is exposed to light. It takes approximately 1.2 seconds from the time at which a human eye is exposed to light until the diameter of the pupil becomes the smallest. Therefore, in a camera having a red-eye reduction function, if flash light is used for the purpose of reducing the red-eye phenomenon, the release time lag between the time at which the start of photo-taking is instructed and the time at which photo-taking (exposure operation) is actually carried out becomes long. Consequently, this time lag poses a problem in the event where the user wants to take a photograph in a hurry by pressing the release button all the way down in one stroke.

SUMMARY OF THE INVENTION

The object of the present invention is to provide a new and useful camera in which the problem described above is resolved.

Another object of the present invention is to provide a camera in which the ease of use during flash photography is improved.

Yet another object of the present invention is to provide a camera capable of producing pictures with a reduced red-eye phenomenon.

Yet another object of the present invention is to provide a camera capable of performing good distance measurement even when the brightness of the photo object is low.

Yet another object of the present invention is to provide a camera in which the release time lag is reduced in photo-taking accompanied by light emission for red-eye reduction.

In order to achieve the objects described above, the first invention in this application is a camera comprising: a distance measurement unit; an exposure unit; a light source which is capable of emitting lights for distance measurement and for red-eye reduction; and a controller which prohibits said light source from emitting light for red-eye reduction when exposure is started within a predetermined time after the light source emits light for distance measurement.

The second invention in this application is a camera comprising: a distance measurement unit; an exposure unit; a light source; a timer which counts a time between start of distance measurement and start of exposure; and a controller which instructs said light source to emit light before distance measurement, and then to emit again before exposure when said timer counts up to a predetermined time.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
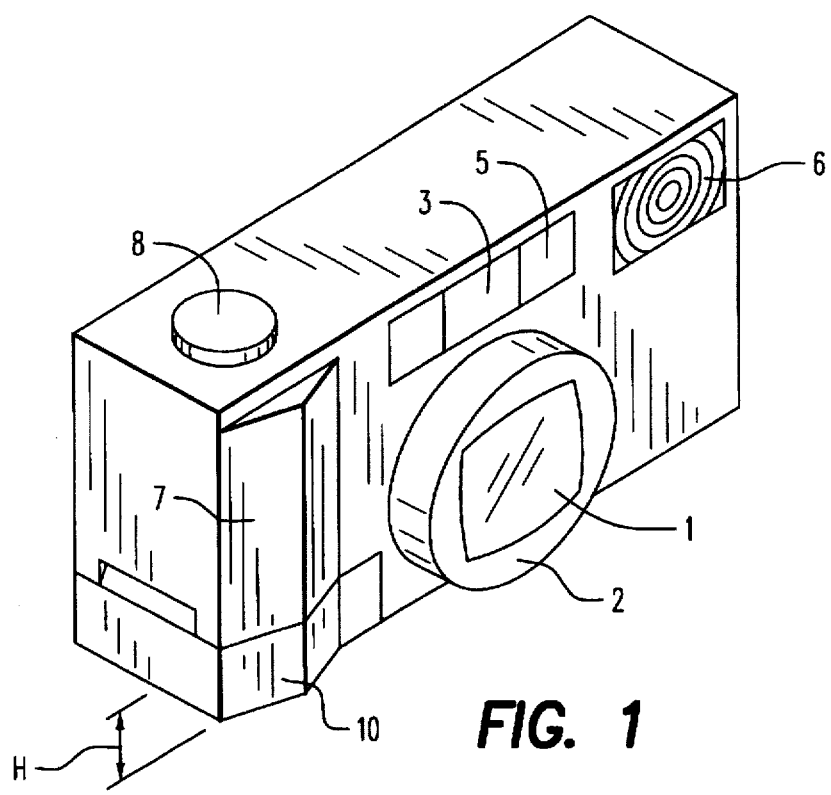
FIG. 1 is a perspective view of a camera, one embodiment of the present invention.

FIG. 1 shows the outer view of a camera, one embodiment of the present invention. As shown in FIG. 1, lens mount 2 that holds photo-taking lens 1 is located in the center of the front side of the camera body, and finder window 3 is located above said lens mount 2. Light receiving window 5 used in distance measurement is located next to finder window 3. The light emitting member of flash unit 6, which is built into the camera body, is located at one corner of the front side of the camera body. Grip protrusion 7 is formed on the side opposite from flash unit 6 and on the front side of the camera body, and release button 8 is located on the top side of the camera body and on the same side as protrusion 7. Cover 10 is located at the bottom of the camera body on the same side as protrusion 7, and is opened and closed to load and remove film cartridge 9.

Figure 2:
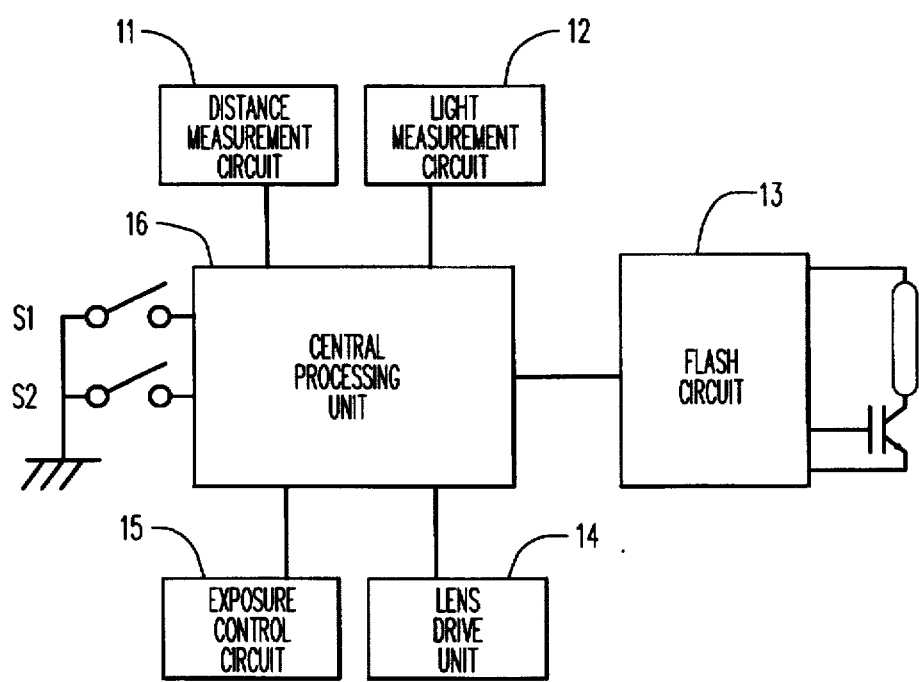
FIG. 2 is a circuit block diagram of the camera shown in FIG. 1.

FIG. 2 is one example of a circuit block diagram of the camera described above. As shown in FIG. 2, this circuit comprises distance measurement circuit 11 that measures the distance to the photo object, light measurement circuit 12 that measures the brightness of the photo object, flash circuit 13 that causes flash unit 6 to emit light, lens drive unit 14 that drives the photo-taking lens based on the distance to the photo object, exposure control circuit 15 that controls the exposure time and aperture based on the brightness of the photo object, light measurement switch S1 to instruct the start of light measurement, exposure start switch S2 to instruct the start of exposure, and central processing unit (CPU) 16 that controls the operations of distance measurement circuit 11, light measurement circuit 12, flash circuit 13, lens drive circuit 14 and exposure control circuit 15 based on the states of switches S1 and S2.

Distance measurement circuit 11 employs the passive method, and takes approximately 0.2 seconds to carry out distance measurement. Where the brightness of the photo object is extremely low, distance measurement circuit 11 cannot detect the light from the photo object and cannot perform distance measurement. In such a situation, auxiliary light is emitted using flash unit 6 in order to carry out distance measurement. Therefore, distance measurement in a low photo object brightness situation takes approximately 0.4 seconds.

Light measurement circuit 12 takes approximately 0.1 second for light measurement.

Flash circuit 13 causes flash unit 6 to emit light to illuminate the photo object when photo-taking of a low-brightness photo object is taking place. It also causes flash unit 6 to emit a prescribed small amount of light (auxiliary light) in order to reduce the red-eye phenomenon prior to flash photography (hereinafter the emission of auxiliary light for red-eye reduction will be called the 'pre-emission'). In addition, flash circuit 13 also causes flash unit 6 to emit auxiliary light for distance measurement when distance measurement cannot be performed by said distance measurement circuit 11 due to low photo object brightness. In this case, it controls flash unit 6 such that pulsing light is emitted for a period of 100 milliseconds using a prescribed small amount of light in the emission of auxiliary light.

Lens drive unit 14 drives the photo-taking lens based on the photo object distance. It takes approximately 0.3 seconds to drive the lens.

Light measurement switch S1 becomes ON when release button 8 is pressed halfway. The turning ON of light measurement switch S1 starts distance measurement and light measurement. Exposure start switch S2 becomes ON when release button 8 is pressed all the way down.

The turning ON of exposure start switch S2 starts lens drive and exposure control.

CPU 16 comprises a single-chip microcomputer.

Figure 3:
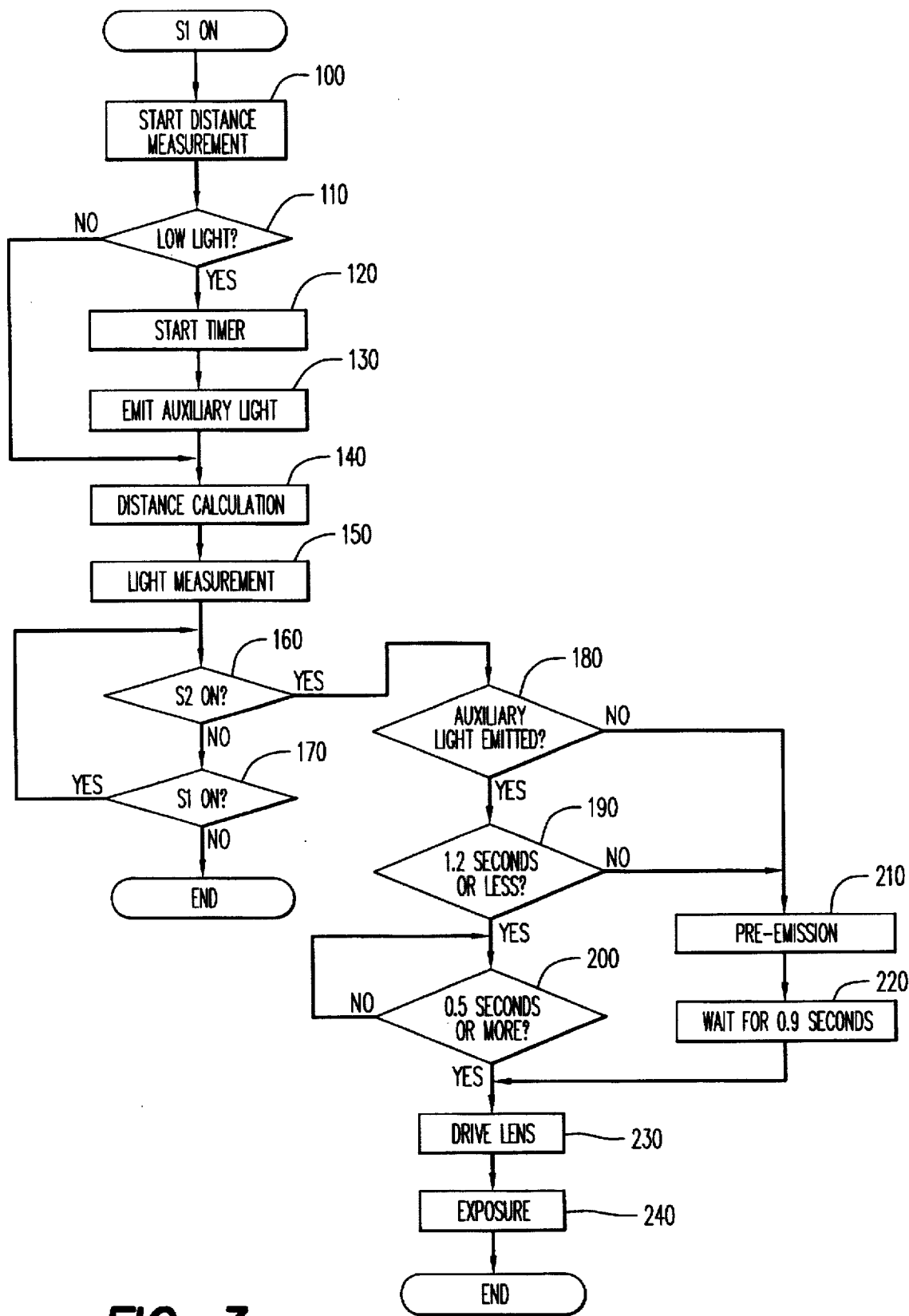
FIG. 3 is a flow chart to explain the operation sequence from the time at which the light measurement switch becomes ON until exposure takes place.

FIG. 3 is an example of flow chart of the routine performed by CPU 16 and explains the process from the turning ON of light measurement switch S1 until exposure takes place, or in other words, until a photo is taken. For the sake of simplification, the explanation will be provided regarding the situation in which flash light is emitted whenever a photo is taken, and other cases will be omitted from the explanation.

When release button 8 is pressed and switch S1 becomes ON, distance measurement is instructed to be begun (step #100). When this is done, it is determined whether or not distance measurement by distance measurement circuit 11 is impossible due to low photo object brightness, and if distance measurement is determined to be impossible, the timer is started and the flash unit is caused to emit auxiliary light (steps #110, #120, #130). Distance calculation is then carried out, and the photo object distance is obtained (step #140). On the other hand, where distance measurement is determined to be possible, distance calculation is carried out and the distance to the photo object is obtained without the timer starting. The timer is used to count the time that elapses after the auxiliary light is emitted.

Following the distance calculation (step #140), light measurement circuit 12 is instructed to perform the light measurement operation (step #150). When light measurement is completed, CPU 16 waits for exposure start switch S2 to become ON as well as for light measurement switch S1 to become OFF (steps #160, #170). If light measurement switch S1 becomes OFF during the standby period (NO in step #170), or in other words, if the user takes his finger off release button 8, all controls are ended. On the other hand, if exposure start switch S2 becomes ON through the further pressing of release button 8 (YES in step #160), it is determined whether or not auxiliary light was emitted for distance measurement (step #180), and if it was not, the flash unit is caused to perform pre-emission for red-eye reduction (step #210). CPU 16 then waits for 0.9 seconds (step #220), after which it causes lens drive unit 14 to carry out lens drive for focusing (step #230) and instructs exposure (principal flash light emission) (step #240).

Where it is determined in step #180 that auxiliary light was emitted, it is determined how much time has elapsed since the start of emission of auxiliary light (steps #190, #200). Where more than 1.2 seconds have elapsed, CPU 16 advances to step #210 and pre-emission, lens drive and exposure are carried out in the manner described above. Where the time that has elapsed is between 0.5 seconds and 1.2 seconds, CPU 16 advances to step #230 immediately, and lens drive and exposure are carried out without pre-emission. Where the time that has elapsed is less than 0.5 seconds, CPU 16 waits until 0.5 seconds elapse and advances to step #230. It then instructs exposure without pre-emission.

Figure 4A:
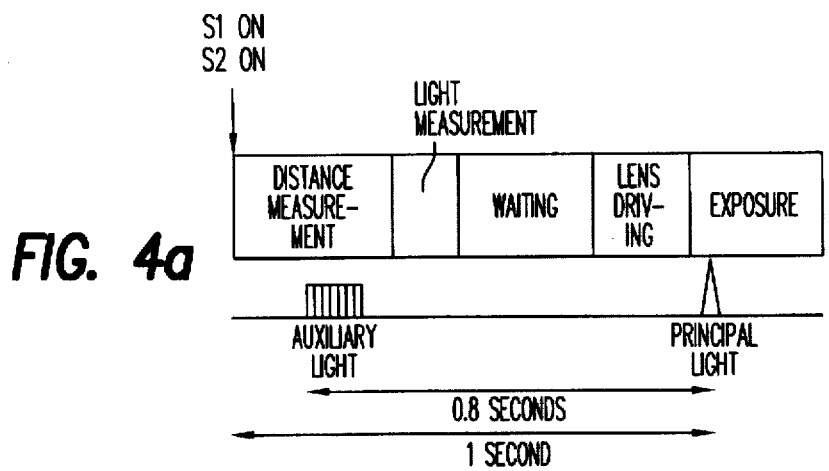
FIG. 4 comprises time charts showing, in the present invention, the operation sequence from the time at which the light measurement switch becomes ON until exposure takes place.

FIGS. 4(a), (b) and (c) are time charts showing the operation sequence from the turning ON of light measurement switch S1 through exposure.

FIG. 4(a) is a time chart showing the operation sequence when light measurement switch S1 and release start switch S2 become ON at essentially the same time because release button 8 is quickly pressed down all the way in one stroke (the time between the turning ON of switch S1 and the turning ON of switch S2 is less than 0.5 seconds). Exposure (principal light emission) is carried out 0.8 seconds after the emission of auxiliary light. Therefore, exposure takes place one second after light measurement switch S1 becomes ON.

Because the photo object is illuminated via the emission of auxiliary light, principal flash light emission takes place when the diameter of the pupil has become almost the smallest. As a result, the occurrence of the red-eye phenomenon is reduced. In addition, the release time lag is reduced in comparison with conventional cameras, and therefore the likelihood of missing a photo-taking opportunity decreases in comparison with conventional cameras.

Figure 4B:
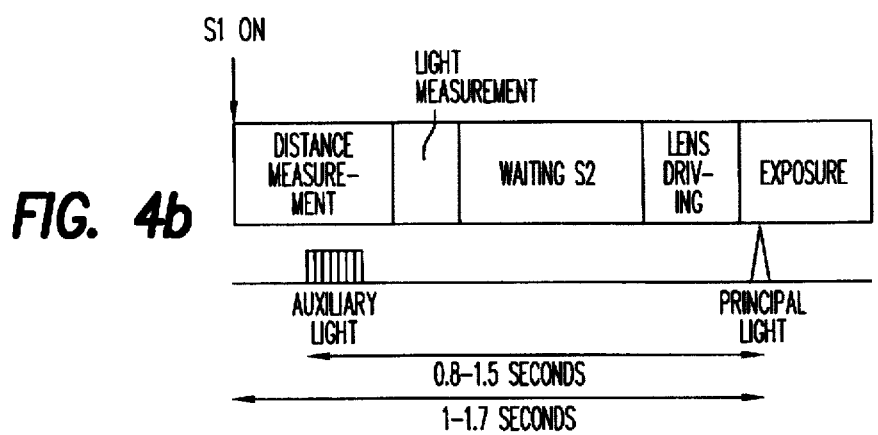

FIG. 4(b) is a time chart for the situation in which exposure start switch S2 becomes ON after 0.5 seconds to 1.4 seconds have elapsed following light measurement switch S1 becoming ON. Exposure (principal light emission) takes place between 0.8 seconds and 1.5 seconds after the emission of auxiliary light.

Because principal light emission takes place between the time at which the pupil has become almost the smallest via auxiliary light emission and the time at which the diameter of the pupil has slightly increased from the smallest diameter, the occurrence of the red-eye phenomenon is reduced. In addition, the release time lag is reduced in comparison with conventional cameras, and therefore the likelihood of missing a photo-taking opportunity decreases in comparison with conventional cameras.

Figure 4C:
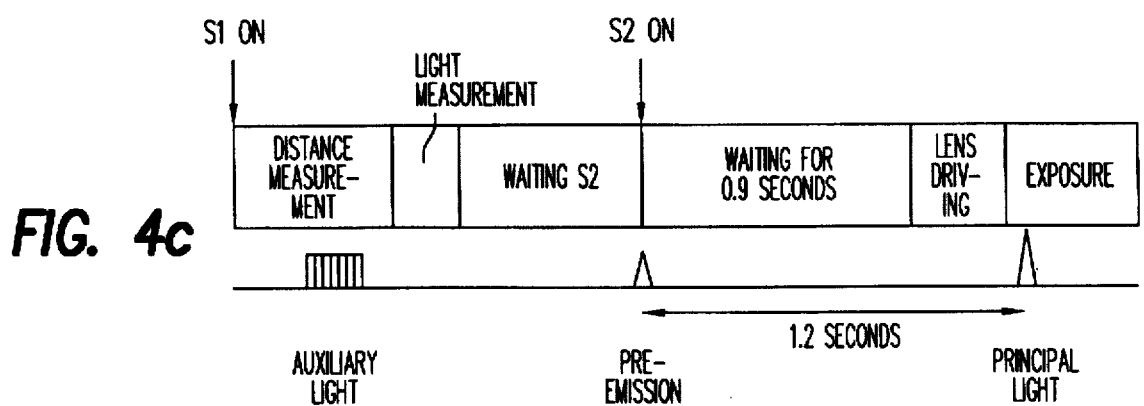

FIG. 4(c) is a time chart for the situation in which the time between light measurement switch S1 becoming ON and exposure start switch S2 becoming ON is quite long. Pre-emission takes place based on exposure start switch S2 becoming ON and exposure (principal light emission) is carried out 1.2 seconds after said emission. Because principal light emission takes place at the time at which the diameter of the pupil has become the smallest due to the pre-emission, the occurrence of the red eye phenomenon can be reduced greatly.

Figure 5:
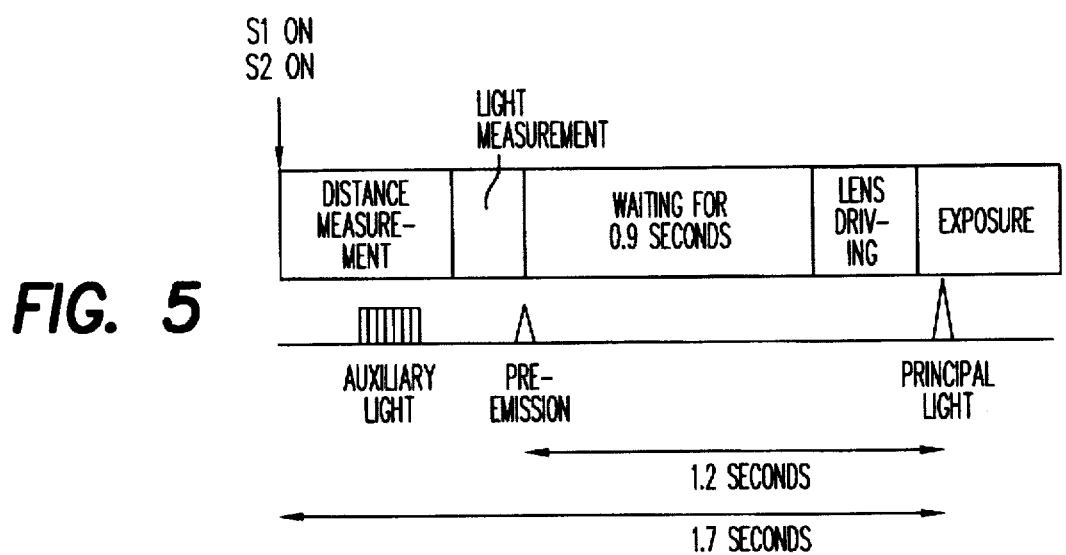
FIG. 5 is a time chart showing, in a comparison example, the operation sequence from the time at which the light measurement switch becomes ON until exposure takes place.
Figure 6:
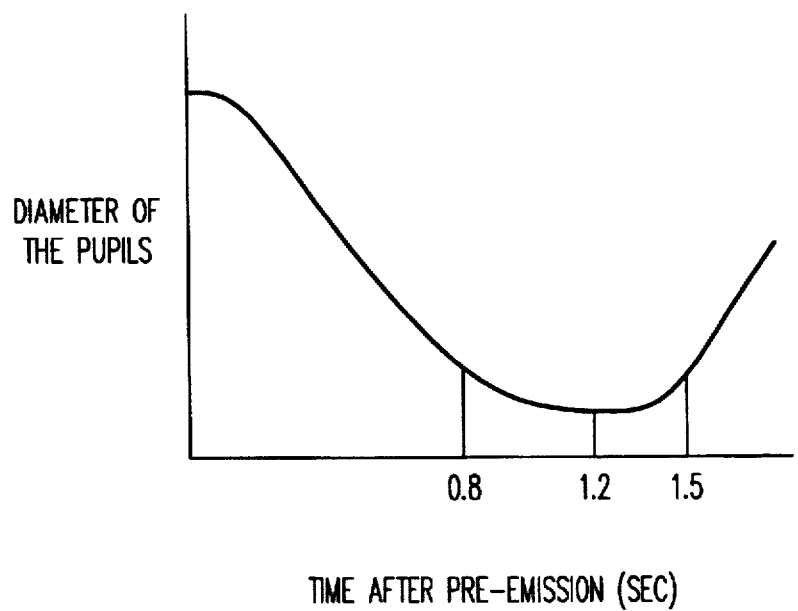
FIG. 6 is a drawing showing changes in the diameter of the pupil over time when a human eye is exposed to light.

FIG. 5 is a time chart for the situation in which light measurement switch S1 and exposure start switch S2 become ON essentially at the same time, in a photo-taking sequence in which pre-emission for red-eye reduction is carried out independently of the auxiliary light emission for distance measurement.

In this case, it takes 1.7 seconds from the time at which light measurement switch S1 becomes ON until exposure takes place. This time period is one second at the shortest in the camera in which the present invention is applied, realizing a large reduction in release time lag.

In this embodiment, when the time period between the turning ON of light measurement switch S1 and the turning ON of exposure start switch S2 is short, it is determined that photo-taking is being performed in a hurried fashion, and the time between the auxiliary light emission and principal light emission is set to be 0.8 seconds, which is shorter than the 1.2 seconds using which the pupil diameter becomes the smallest. Consequently, additional time reduction is realized in addition to the time reduction due to the prohibition of pre-emission for red-eye reduction. This is also true when auxiliary light is not emitted for distance measurement and pre-emission for red-eye reduction is required. Naturally, in a camera in which pre-emission for red-eye reduction is carried out independently of auxiliary light emission for distance measurement, by carrying out principal light emission at the time when the pupil diameter has become almost the smallest, which is slightly before the time at which the pupil diameter becomes the smallest, the release time lag can be reduced.

In the present embodiment, the time period between the pre-emission for red-eye reduction and the time at which the pupil diameter becomes the smallest is set to be 1.2 seconds, and the time range during which the pupil diameter is thought to be almost the smallest is set to be 0.8 seconds to 1.5 seconds. However, these time periods are determined based on the amount of light emitted, the duration of emission, the allowable level of red-eye, the necessity of shortening the release time lag, etc., and are not limited to the time periods mentioned above.

The reduction in release time lag due to the prohibition of pre-emission for red-eye reduction is effective only when auxiliary light for distance measurement is used. Nevertheless, the present invention is effective in most flash photography situations because flash photography is in most cases required due to low object brightness, and auxiliary light is very often used because distance measurement is impossible in such cases.

The light emission for red-eye reduction and the auxiliary light emission for distance measurement are carried out using a flash unit in this embodiment. The present invention is not limited to this, however, and may be applied in cameras in which red-eye reduction and distance measurement assistance are provided using a lamp or LED, for example.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A camera comprising:
   a distance measurement unit;
   an exposure unit;
   a light source which is capable of emitting lights for distance measurement and for red-eye reduction; and
   a controller which prohibits said light source from emitting light for red-eye reduction when exposure is started within a predetermined time after the light source emits light for distance measurement.

2. The camera as claimed in claim 1 wherein said distance measurement unit employs passive method.

3. The camera as claimed in claim 1 wherein said light source emits flash light.

4. The camera as claimed in claim 3 wherein said light source is used for flash photography.

5. The camera as claimed in claim 4 wherein said light source emits a smaller amount of light for red-eye reduction than that for flash photography.

6. The camera as claimed in claim 4 wherein said light source emits a smaller amount of light for distance measurement than that for flash photography.

7. The camera as claimed in claim 1 wherein said predetermined time is set to minimize diameter of pupil of a human eye so that red-eye phenomenon is reduced.

8. The camera as claimed in claim 7 wherein said controller permits the light source to emit light for red-eye reduction before diameter of pupil of a human eye becomes the smallest.

9. A camera which emits light for red-eye reduction and light for distance measurement when brightness of photo object is low using a single light source, wherein said camera prohibits light emission for red-eye reduction from said light source when said light source has emitted light for distance measurement immediately prior to exposure.

10. The camera as claimed in claim 9 which permits light emission for red-eye reduction before diameter of pupil of a human eye becomes the smallest.

11. The camera as claimed in claim 9 which further comprises a sensor for detecting brightness of a photo object.

12. A camera comprising:
    a distance measurement unit;
    an exposure unit;
    a light source;
    a timer which counts a time between start of distance measurement and start of exposure; and
    a controller which instructs said light source to emit light before distance measurement, and then to emit again before exposure when said timer counts up to a predetermined time.

13. The camera as claimed in claim 12 wherein said predetermined time is set so that the exposure unit operates after diameter of pupil of a human eye becomes the smallest.

14. The camera as claimed in claim 1 wherein said controller delays start of exposure when the exposure unit operates before a second time period shorter than the predetermined time elapses.

15. The camera as claimed in claim 14 wherein said second predetermined time is set so that the exposure unit operates before diameter of pupil of a human eye becomes the smallest.

16. A camera which emits light for distance measurement prior to exposure comprising:
    a distance measurement circuit measuring a distance to a photo object;

a distance measurement instruction device which instructs start of distance measurement;

a release instruction device which instructs start of exposure, a timer counting a time between an instruction from said distance measurement instruction device and an instruction from said release instruction device; and a controller which causes light emission to occur in response to the instruction to start distance measurement and which also causes light emission to occur once again prior to the exposure when a period of time longer than a prescribed time period is counted by said timer.

17. The camera as claimed in claim 16 wherein said predetermined time is set so that the exposure unit operates after diameter of pupil of a human eye becomes the smallest by the light emission for distance measurement.

18. The camera as claimed in claim 16 wherein said controller postpones start of exposure when the start of release is instructed before a second time period shorter than the predetermined time elapses.

19. The camera as claimed in claim 18 wherein said second predetermined time is set so that the exposure unit operates before diameter of pupil of a human eye becomes the smallest by a light emission.

* * * * *